(12) United States Patent
Orgeron (10) Patent No.: US 8,469,085 B2
(45) Date of Patent: Jun. 25, 2013

(54) PIPE STAND

(75) Inventor: Keith J. Orgeron, Spring, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 154 days.

(21) Appl. No.: 12/850,572

(22) Filed: Aug. 4, 2010

(65) Prior Publication Data
US 2011/0030942 A1 Feb. 10, 2011

Related U.S. Application Data (60) Provisional application No. 61/231,272, filed on Aug. 4, 2009.

(51) Int. Cl.
*E21B 19/14* (2006.01)
(52) U.S. Cl.
USPC ..................................... 166/77.51; 166/85.1
(58) Field of Classification Search
USPC .................... 166/379, 380, 77.1, 77.51, 85.1
See application file for complete search history.

(56) References Cited

U.S. PATENT DOCUMENTS

| | | | |
|---|---|---|---|
| 3,177,944 A | 4/1965 | Knights | |
| 3,464,507 A | 9/1969 | Alexander et al. | |
| 3,559,821 A * | 2/1971 | James | 414/22.61 |
| 3,633,771 A | 1/1972 | Woolslayer et al. | |
| 3,706,347 A * | 12/1972 | Brown | 175/85 |
| 3,792,783 A | 2/1974 | Brown | |
| 3,860,122 A | 1/1975 | Cernosek | |
| 3,986,619 A | 10/1976 | Woolslayer et al. | |
| 4,172,684 A | 10/1979 | Jenkins | |
| 4,290,495 A | 9/1981 | Elliston | |
| 4,386,883 A | 6/1983 | Hogan et al. | |
| 4,403,666 A | 9/1983 | Willis | |
| 4,403,897 A | 9/1983 | Willis | |
| 4,403,898 A | 9/1983 | Thompson | |
| 4,407,629 A | 10/1983 | Willis | |
| 4,426,182 A | 1/1984 | Frias et al. | |
| 4,492,501 A | 1/1985 | Haney | |

(Continued)

FOREIGN PATENT DOCUMENTS

JP 05-044385 A 2/1993

OTHER PUBLICATIONS

U.S. Appl. No. 11/923,451, filed Oct. 24, 2007; non-published; titled "Pipe Handling Apparatus and Method" and having a common inventor with the present application.

*Primary Examiner* — William P Neuder
(74) *Attorney, Agent, or Firm* — John G. Fischer, Esq.; Paul D. Lein, Esq.; Scheef & Stone, L.L.P.

(57) ABSTRACT

An active, smartpipe stand (apparatus and method) for feeding and receiving pipe in a horizontal orientation to and from a pipe handling apparatus has a first pipe-lifting mechanism, a second pipe-lifting mechanism, and a pipe-rotating mechanism positioned between the first and second pipe-lifting mechanisms. The bottom of the first pipe-lifting mechanism is connected to the skid of the pipe handling apparatus. The bottom of the second pipe-lifting mechanism is connected to the skid of the pipe handling apparatus. The bottom of the pipe-rotating mechanism is connected to the skid of the pipe handling apparatus. Individual tubulars are unloaded, prepared, staged and sequenced, assembled and presented for delivery from horizontal to vertical. The pipe stand is positioned under the boom of the pipe handling apparatus when the apparatus is in the first position. The pipe stand extends within the skid structure.

20 Claims, 7 Drawing Sheets

U.S. PATENT DOCUMENTS

| | | | |
|---|---|---|---|
| 4,547,110 A | 10/1985 | Davidson | |
| 4,595,066 A | 6/1986 | Nelmark et al. | |
| 4,604,724 A | 8/1986 | Shaginian et al. | |
| 4,708,581 A | 11/1987 | Adair | |
| 4,759,414 A | 7/1988 | Willis | |
| 4,765,401 A | 8/1988 | Boyadjieff | |
| 4,822,230 A | 4/1989 | Slettedal | |
| 4,834,604 A | 5/1989 | Brittain et al. | |
| 5,458,454 A | 10/1995 | Sorokan | |
| 5,931,238 A | 8/1999 | Gilmore et al. | |
| 6,003,598 A | 12/1999 | Andreychuk | |
| 6,079,925 A | 6/2000 | Morgan et al. | |
| 6,220,807 B1 | 4/2001 | Sorokan | |
| 6,311,788 B1 | 11/2001 | Weixler | |
| 6,543,551 B1 | 4/2003 | Sparks et al. | |
| 6,543,555 B2 | 4/2003 | Casagrande | |
| 6,581,698 B1 | 6/2003 | Dirks | |
| 6,609,573 B1 | 8/2003 | Day | |
| 6,705,414 B2 | 3/2004 | Simpson et al. | |
| 6,779,614 B2 | 8/2004 | Oser | |
| 6,854,520 B1 | 2/2005 | Robichaux | |
| 6,969,223 B2 | 11/2005 | Tolmon et al. | |
| 7,021,880 B2 | 4/2006 | Morelli et al. | |
| 2002/0079105 A1 | 6/2002 | Bergeron | |
| 2003/0170095 A1 | 9/2003 | Slettedal | |
| 2005/0269133 A1 | 12/2005 | Little | |
| 2006/0045654 A1 | 3/2006 | Guidroz | |
| 2007/0074460 A1 | 4/2007 | Belik | |
| 2008/0202812 A1 | 8/2008 | Childers et al. | |
| 2008/0253866 A1 | 10/2008 | Lops et al. | |
| 2009/0071720 A1 | 3/2009 | Cowan | |
| 2012/0118639 A1* | 5/2012 | Gerber | 175/52 |

* cited by examiner

PIPE STAND

BACKGROUND OF THE INVENTION

1. Field of the Invention

The present invention relates to pipe stands for pipe handling apparatus. Particularly, the present invention relates to pipe stands that deliver pipe, casing, and other tubulars to a pipe handling apparatus. Additionally, the present invention relates to pipe stands that receive and store pipe, casing and other tubulars from a pipe handling apparatus.

2. Description of Related Art Including Information Disclosed Under 37 CFR 1.97 and 37 CFR 1.98

Drill rigs have utilized several methods for transferring tubular members from a pipe rack adjacent to the drill floor to a position above the drill floor or the well bore for connection to a previously transferred tubular or tubular string. The term "pipe" as used herein includes all forms of tubulars, such as drill pipes, drill collars, casings, liners, bottom hole assemblies (BHA), and other types of tubular known in the art.

Conventionally, drill rigs have utilized a combination of rig cranes and traveling systems for transferring a tubular from the pipe rack to a vertical position above the center of the well. The obvious disadvantage with the prior art systems is that there is a significant manual involvement in attaching the pipe elevators to the tubular and moving the pipe from the drill rack to the rotary table at the well head. This manual transfer operation in the vicinity of workers is potentially dangerous and has caused numerous injuries in drilling operations. Further, the hoisting system allows the tubular to contact the catwalk or other portions of the rig as the tubular is transferred from the pipe rack to the drill floor. This can damage the tubular and may affect the integrity of the connections between successive tubulars of a tubular string in the well.

In the past, various devices have been created which mechanically move a pipe from a horizontal orientation to a vertical orientation such that the vertically-oriented pipe can be installed into the well bore. Typically, these devices have utilized several interconnected arms that are associated with a boom. In order to move the pipe, a succession of individual movements of the levers, arms and other components of the boom must be performed in a coordinated manner in order to achieve the desired result. Typically a wide variety of hydraulic actuators are connected to each of the components so as to carry out the prescribed movement. A complex control mechanism is connected to each of these actuators so as to achieve the desired movement. Advanced programming is required of the controller in order to properly coordinate the movements in order to achieve this desired result.

Unfortunately, with such systems, the hydraulic actuators, along with other components, can become worn with time. Furthermore, the hydraulic integrity of each of the actuators can become compromised over time. As such, small variations in each of the actuators can occur. These variations, as they occur, can make the complex mechanism rather inaccurate. The failure of one hydraulic component can exacerbate the problems associated with the alignment of the pipe in a vertical orientation. Adjustments of the programming are often necessary so as to continue to achieve the desired results. Fundamentally, the more hydraulic actuators that are incorporated into such a system, the more likely it is to have errors, inaccuracies and deviations in the desired delivery profile of the tubular. Typically, very experienced and knowledgeable operators are required so as to carry out this pipe movement operation. This adds significantly to the cost associated with pipe delivery. Thus, there is a need for pipe delivery systems that are less complicated and that can operate accurately without costly personnel.

In the past, pipe handling apparatus have not been used for the installation of casing. The problem associated with casing is that the threads of the casing are formed on an inner wall and on an outer wall at the ends of each of the casing sections. Whenever these threads are formed, the relatively thin wall thickness of the casing is further minimized. Additionally, great precision is required so as to properly thread the threads of one casing section within the threads of an adjacent casing section. The amount of accuracy required for the delivery of the casing by a pipe handling apparatus, in the past, has not been sufficient so as to achieve the desired degree of accuracy for the installation of the casing sections in their threaded connection. The improper installation of one casing section upon another casing section can potentially damage the threads associated with such casing sections. Additionally, in the past, the pipe handling apparatus could potentially damage the thin-walled casing sections during the delivery. As such, a need has developed to adapt a pipe handling apparatus so as to achieve the desired amount of accuracy for the installation of casing sections.

It is also desirable to be able to grip casing or pipe positioned on a rack adjacent a drilling well, move the same into vertical orientation over the well bore, and thereafter lower the same onto a drill string suspended in the well bore.

Various patents have issued relating to pipe handling apparatus. For example, U.S. Pat. No. 3,177,944, issued on Apr. 13, 1965 to R. N. Knights, describes a racking mechanism for earth boring equipment that provides for horizontal storage of pipe lengths on one side of and clear of the derrick. This is achieved by means of a transport arm which is pivoted toward the base of the derrick for swing movement in a vertical plane. The outer end of the arm works between a substantially vertical position in which it can accept a pipe length from, or deliver a pipe length to, a station in the derrick, and a substantially horizontal portion in which the arm can deliver a pipe length to, or accept a pipe length from, a station associated with storage means on one side of the derrick.

U.S. Pat. No. 3,464,507, issued on Sep. 2, 1969 to E. L. Alexander et al., teaches a portable rotary pipe handling system. This system includes a mast pivotally mounted and movable between a reclining transport position to a desired position at the site drilling operations which may be at any angle up to vertical. The mast has guides for a traveling mechanism that includes a block movable up and down the mast through operation of cables reeved from the traveling block over crown block pulleys into a drawwork. A power drill drive is carried by the traveling block. An elevator for drill pipe is carried by an arm swingably mounted relative to the power unit. Power tongs, slips and slip bushings are supported adjacent the lower end of the mast and adapted to have a drill pipe extend therethrough from a drive bushing connected to a power drive whereby the drill pipe is extended in the direction of the hole to be drilled.

U.S. Pat. No. 3,633,771, issued on Jan. 11, 1972 to Woolslayer et al., discloses an apparatus for moving drill pipe into and out of an oil well derrick. A stand of pipe is gripped by a strongback which is pivotally mounted to one end of a boom. The boom swings the strongback over the rotary table thereby vertically aligning the pipe stand with the drill string. When both adding pipe to and removing pipe from the drill string, all vertical movement of the pipe is accomplished by the elevator suspended from the traveling block.

U.S. Pat. No. 3,860,122, issued on Jan. 14, 1975 to L. C. Cernosek, describes an apparatus for transferring a tubular member, such as a pipe, from a storage area to an oil well drilling platform. The positioning apparatus includes a pipe positioner mounted on a platform for moving the pipe to a release position whereby the pipe can be released to be lowered to a submerged position. A load means is operably attached or associated with the platform and positioning means in order to move the pipe in a stored position to a transfer position in which the pipe is transferred to the positioner. The positioner includes a tower having pivotally mounted thereon a pipe track with a plurality of pipe clamp assemblies which are adapted to receive a pipe length. The pipe track is pivotally movable by hydraulic power means or gear means between a transfer position in which pipe is moved into the plurality of clamp assemblies and the release position in which the pipe is released for movement to a submerged position.

U.S. Pat. No. 3,986,619, issued on Oct. 19, 1976 to Woolslayer et al., shows a pipe handling apparatus for an oil well drilling derrick. In this apparatus, the inner end of the boom is pivotally supported on a horizontal axis in front of a well. A clamping means is pivotally connected to the outer end of the boom on an axis parallel to the horizontal axis at one end. The clamping means allows the free end of the drill pipe to swing across the boom as the outer end of the boom is raised or lowered. A line is connected at one end with the traveling block that raises and lowers the elevators and at the other end to the boom so as to pass around sheaves.

U.S. Pat. No. 4,172,684, issued on Oct. 30, 1979 to C. Jenkins, shows a floor level pipe handling apparatus which is mounted on the floor of an oil well derrick suitable structure. This apparatus includes a support that is rockable on an axis perpendicular to the centerline of a well being drilled. One end of an arm is pivotally mounted on the support on an axis transverse to the centerline of the well. The opposite end of the arm carries a pair of shoes having laterally opening pipe-receiving seats facing away from the arm. The free end of the arm can be swung toward and away from the well centerline and the arm support can be rocked to swing the arm laterally.

U.S. Pat. No. 4,403,666, issued on Sep. 13, 1983 to C. A. Willis, shows self-centering tongs and a transfer arm for a drilling apparatus. The clamps of the transfer arm are resiliently mounted to the transfer arm so as to provide limited axial movement of the clamps and thereby of a clamped downhole tubular. A pair of automatic, self-centering, hydraulic tongs is provided for making up and breaking out threaded connections of tubulars.

U.S. Pat. No. 4,407,629, issued on Oct. 4, 1983 to C. A. Willis, teaches a lifting apparatus for downhole tubulars. This lifting apparatus includes two rotatably mounted clamps which are rotatable between a side-loading position so as to facilitate the loading and unloading in the horizontal position, and a central position, in which a clamped tubular is aligned with the drilling axis when the boom is in the vertical position. An automatic hydraulic sequencing circuit is provided to automatically rotate the clamps into the side-loading position whenever the boom is pivoted with a downhole tubular positioned in the clamp. In this position, the clamped tubular is aligned with a safety plate mounted on the boom to prevent a clamped tubular from slipping from the clamps.

U.S. Pat. No. 4,492,501, issued on Jan. 8, 1985 to K. M. Haney, provides a platform positioning system for a drilling operation which includes a support structure and a transfer arm pivotally connected to the support structure to rotate about a first axis. This platform positioning system includes a platform which is pivotally connected to the support structure to rotate about a second axis, and a rod which is mounted between the transfer arm and the platform. The position of the arm and platform axes and the length of the rod are selected such that the transfer arm automatically and progressively raises the platform to the raised position by means of the rod as the transfer arm moves to the raised position. The transfer arm automatically and progressively lowers the platform to the lowered position by means of the rod as the transfer arm moves to the lowered position.

U.S. Pat. No. 4,595,066, issued on Jun. 17, 1986 to Nelmark et al., provides an apparatus for handling drill pipes and used in association with blast holes. This system allows a drill pipe to be more easily connected and disconnected to a drill string in a hole being drilled at an angle. A receptacle is formed at the lower end of the carrier that has hydraulically operated doors secured by a hydraulically operated lock. A gate near the upper end is pneumatically operated in response to the hydraulic operation of the receptacle lock.

U.S. Pat. No. 4,822,230, issued on Apr. 18, 1989 to P. Slettedal, teaches a pipe handling apparatus which is adapted for automated drilling operations. Drill pipes are manipulated between substantially horizontal and vertical positions. The apparatus is used with a top mounted drilling device which is rotatable about a substantially horizontal axis. The apparatus utilizes a strongback provided with clamps to hold and manipulate pipes. The strongback is rotatably connected to the same axis as the drilling device. The strongback moves up or down with the drilling device. A brace unit is attached to the strongback to be rotatable about a second axis.

U.S. Pat. No. 4,834,604, issued on May 30, 1989 to Brittain et al., provides a pipe moving apparatus and method for moving casing or pipe from a horizontal position adjacent a well to a vertical position over the well bore. The machine includes a boom movable between a lowered position and a raised position by a hydraulic ram. A strongback grips the pipe and holds the same until the pipe is vertically positioned. Thereafter, a hydraulic ram on the strongback is actuated thereby lowering the pipe or casing onto the string suspended in the wellbore and the additional pipe or casing joint is threaded thereto.

U.S. Pat. No. 4,708,581, issued on Nov. 24, 1987H. L. Adair, provides a method for positioning a transfer arm for the movement of drill pipe. A drilling mast and a transfer arm are mounted at a first axis adjacent the mast to move between a lowered position near ground level and an upper position aligned with the mast. A reaction point anchor is fixed with respect to the drilling mast and spaced from the first axis. A fixed length link is pivotally mounted to the transfer arm at a second axis, spaced from the first axis, and a first single stage cylinder is pivotally mounted at one end to the distal end of the link and at the other end to the transfer arm. A second single stage hydraulic cylinder is pivotally mounted at one end to the distal end of the link and at the other end to the reaction point.

U.S. Pat. No. 4,759,414, issued on Jul. 26, 1988 to C. A. Willis, provides a drilling machine which includes a drilling superstructure skid which defines two spaced-apart parallel skid runners and a platform. The platform supports a drawworks mounted on a drawworks skid and a pipe boom is mounted on a pipe boom skid sized to fit between the skid runners of the drilling substructure skid. The drilling substructure skid supports four legs which, in turn, support a drilling platform on which is mounted a lower mast section. The pipe boom skid mounts a pipe boom as well as a boom linkage, a motor and a hydraulic pump adapted to power the pipe boom linkage. Mechanical position locks hold the upper skid in relative position over the lower skid.

U.S. Pat. No. 5,458,454, issued on Oct. 17, 1995 to R. S. Sorokan, describes a pipe handling method which is used to move tubulars used from a horizontal position on a pipe rack adjacent the wellbore to a vertical position over the wall center. This method utilizes bicep and forearm assemblies and a gripper head for attachment to the tubular. The path of the tubular being moved is close to the conventional path of the tubular utilizing known cable transfer techniques so as to allow access to the drill floor through the V-door of the drill rig. U.S. Pat. No. 6,220,807 describes apparatus for carrying out the method of U.S. Pat. No. 5,458,454.

U.S. Pat. No. 6,609,573, issued on Aug. 26, 2003 to H. W. F. Day, teaches a pipe handling system for an offshore structure. The pipe handling system transfers the pipes from a horizontal pipe rack adjacent to the drill floor to a vertical orientation in a set-back area of the drill floor where the drill string is made up for lowering downhole. The cantilevered drill floor is utilized with the pipe handling system so as to save platform space.

U.S. Pat. No. 6,705,414, issued on Mar. 16, 2004 to Simpson et al., describes a tubular transfer system for moving pipe between a substantial horizontal position on the catwalk and a substantially vertical position at the rig floor entry. Bundles of individual tubulars are moved to a process area where a stand make-up/break-out machine makes up the tubular stands. The bucking machine aligns and stabs the connections and makes up the connection to the correct torque. The tubular stand is then transferred from the machine to a stand storage area. A trolley is moved into position over the pick-up area to retrieve the stands. The stands are clamped to the trolley and the trolley is moved from a substantially horizontal position to a substantially vertical position at the rig floor entry. A vertical pipe-racking machine transfers the stands to the traveling equipment. The traveling equipment makes up the stand connection and the stand is run into the hole.

U.S. Pat. No. 6,779,614, issued on Aug. 24, 2004 to M. S. Oser, shows another system and method for transferring pipe. A pipe shuttle is used for moving a pipe joint into a first position and then lifting upwardly toward an upper second position.

To address the needs of a desired pipe handling apparatus, the present inventor filed U.S. application Ser. No. 11/923, 451 on Oct. 24, 2007, which discloses a pipe handling apparatus that has a boom pivotally movable between a first position and a second position, a riser assembly pivotally connected to the boom, an arm pivotally connected at one end to the first portion of the riser assembly and extending outwardly therefrom, a gripper affixed to an opposite end of the arm suitable for gripping a diameter of the pipe, a link pivotally connected to the riser assembly and pivotable so as to move relative to the movement of the boom between the first and second positions, and a brace having one end pivotally connected to the boom and an opposite end pivotally connected to the arm between the ends of the arm. The riser assembly has a first portion extending outwardly at an obtuse angle with respect to the second portion. The gripper has a stab frame affixed to an end of the arm, and grippers affixed to the side of the stab frame opposite the arm. The pipe handling apparatus in this previous patent application is uniquely capable of delivering individual tubulars including very large and heavy "risers" as well as assemblies (stands) of tubulars to the well center on the rig floor with sufficient precision to stab and connect the individual tubular or stand to the "stump" of the drillstring (or riser assembly) without human intervention, or a hand-off to or further guidance by another machine in the rig or derrick. This capability means that the crowded, critical path activities concentrated around the well center on the rig floor can be moved away, resulting in safer, more productive, more consistent handling of tubulars, which is a fundamental process in the construction of wells. To support the capabilities of the pipe handling apparatus in this previous patent application, a smart, active pipe stand apparatus and method is required. Such an apparatus and method has been invented and is described below.

When pipe is fed to the pipe handling apparatus of the above-identified patent application, the pipe is in a horizontal position. Typically, pipe is stored near a pipe handling apparatus. For the above pipe handling apparatus, pipe must be stored in the horizontal position so as to feed to the pipe handling apparatus in the horizontal position. Manually feeding the pipe in the horizontal orientation takes time, and injuries can occur to personnel feeding the pipe to the apparatus. The pipe or pipe assembly can range from thirty to ninety-six feet in length, thus the pipe can be very heavy. Personnel must be experienced in handling the pipe to feed the apparatus, and experienced personnel increase the cost of operation of the apparatus. Thus, there is a need for an apparatus and method that automatically assembles various tubulars into stands and feeds pipe assemblies (stands) to the pipe handling apparatus and receives pipe from the apparatus in a quick and cost-effective manner.

The pipe handling apparatus can move up to three thirty-two-foot sections of pipe connected together at once. The thirty-two-foot sections are stored in a pipe rack in a horizontal orientation. Thus, there is a need to connect and disconnect pipe sections before they are fed to the pipe handling apparatus and after they are received from the pipe handling apparatus.

It is an object of the present invention to assemble and feed pipe stands to a pipe handling apparatus when the pipe is in a horizontal orientation.

It is another object of the present invention to make and break pipe connections in a horizontal orientation before the pipe is fed to, and after a pipe is received from, a pipe handling apparatus.

It is another object of the present invention to receive pipe from a pipe handling apparatus when the pipe is in a horizontal orientation.

It is another object of the present invention to automate the feeding and receiving of pipe from a pipe handling apparatus.

It is another object of the present invention to move pipe between a pipe stand and a drill string.

It is another object of the present invention to decrease the time required to move a pipe between a pipe stand and a drill string.

It is another object to increase safety of personnel near the pipe stand.

It is another object of the present invention to provide an apparatus that can deliver tubulars from a horizontal to a vertical position.

It is an object of the present invention to translate a pipe with the grippers of a pipe handling apparatus.

It is another object of the present invention to move pipe without the use of an oil derrick.

It is another object of the present invention to provide an apparatus that allows relatively unskilled workers to carry out tubular handling activities.

It is another object to reduce the number of workers needed to conduct pipe handling activities.

It is another object to shift individual tubulars from side to side, up and down, and longitudinally, utilizing a series of buffer stations, to facilitate sequencing of individual tubulars into assemblies (stands), and sequencing stands into the drill-string to respond to changes in the required drillstring, replace worn or defective tubulars or assemblies, "off-line", that is without impacting the critical path operation of adding or removing stands from the drillstring on the drillfloor These and other objects and advantages of the present invention will become apparent from a reading of the attached specification.

BRIEF SUMMARY OF THE INVENTION

The present invention is a pipe stand for feeding and receiving pipe in a horizontal orientation to and from a pipe handling apparatus. The pipe handling apparatus has a frame, a main rotating structural member pivotally interconnected to the frame, the main rotating structural member being movable between a first position and a second position, a lever assembly pivotally connected to the main rotating structural member where the lever assembly has a first portion extending outwardly at an obtuse angle with respect to a second portion, an arm pivotally having an end connected to the first portion of the lever assembly and extending outwardly therefrom, a link pivotally connected to the second portion of the lever assembly so that the link pivots at an end of the second portion opposite of the first portion so as to move relative to the movement of the main rotating structural member between the first and second positions, a brace having an end pivotally connected to the main rotating structural member and an opposite end pivotally connected to the arm, a stab frame positioned adjacent the arm below the racking and deployment device, and a plurality of tongs translatably positioned on the stab frame. The support bracket of the device connects to the arm. The rod connects to the arm.

The pipe stand has a first pipe-lifting mechanism, a second pipe-lifting mechanism, and a pipe-rotating mechanism positioned between the first and second pipe-lifting mechanisms. The bottom of the first pipe-lifting mechanism is connected to the skid of the pipe handling apparatus. The bottom of the second pipe-lifting mechanism is connected to the skid of the pipe handling apparatus. The bottom of the pipe-rotating mechanism is connected to the skid of the pipe handling apparatus. The pipe stand is positioned under the boom of the pipe handling apparatus when the apparatus is in the first position. The pipe stand extends within the skid structure.

The first lifting mechanism comprises a central beam, a first roller member connected to an end of the central beam, a second roller member connected to an opposite end of the central beam, a first pivot rod pivotally connected adjacent the end of the central beam, a second pivot rod pivotally connected adjacent the opposite end of the central beam, and a piston-and-cylinder assembly pivotally connected adjacent the opposite end of the central beam. The first roller member has a first spinner attached to an end thereof and a second spinner attached to an opposite end thereof. The second roller member has a first spinner attached to an end thereof and a second spinner attached to an opposite end thereof. The first pivot rod has a pair of pivot rods. One of the pivot rods of the first pivot rod is connected to a side of the central beam and another of the pivot rods of the first pivot rod is connected to an opposite side of the central beam. The second pivot rod has a pair of pivot rods. One of the pivot rods of the second pivot rod is connected to a side of the central beam and another of the pivot rods of the second pivot rod is connected to an opposite side of the central beam. The piston-and-cylinder assembly comprises a pair of piston-and-cylinder assemblies. One of the piston-and-cylinder assemblies of the pair is connected to a side of the central beam and another of the piston and cylinder assemblies of the pair is connected to an opposite side of the central beam. The first and second roller members can be slidable relative to the central beam.

The second lifting mechanism comprises a central beam, a first roller member connected to an end of the central beam, a second roller member connected to an opposite end of the central beam, a first pivot rod pivotally connected adjacent the end of the central beam, a second pivot rod pivotally connected adjacent the opposite end of the central beam, and a piston-and-cylinder assembly pivotally connected adjacent the opposite end of the central beam. The first roller member has a spinner attached thereto. The second roller member has a spinner attached thereto. The first pivot rod has a pair of pivot rods. One of the pivot rods of the first pivot rod is connected to a side of the central beam and another of the pivot rods of the first pivot rod is connected to an opposite side of the central beam. The second pivot rod has a pair of pivot rods. One of the pivot rods of the second pivot rod is connected to a side of the central beam and another of the pivot rods of the second pivot rod is connected to an opposite side of the central beam. The piston-and-cylinder assembly comprises a pair of piston-and-cylinder assemblies. One of the piston-and-cylinder assemblies of the pair is connected to a side of the central beam and another of the piston and cylinder assemblies of the pair is connected to an opposite side of the central beam. The first and second roller members can be slidable relative to the central beam.

The pipe-rotating mechanism comprises a gripper and a spinner member positioned adjacent the gripper. The gripper grips a first pipe section while the spinner member rotates a second pipe section so as to make or break a connection between the first and second pipe sections.

The first and second pipe-lifting mechanisms each have an upward position where pipe is transferred to and from a pipe rack and to and from a pipe handling apparatus, and a lower position where the connection between the first and second pipe sections is made and broken.

The pipe, and each of the first and second pipe sections can be a length of approximately thirty feet to approximately ninety feet.

DETAILED DESCRIPTION OF THE INVENTION

Figure 1:
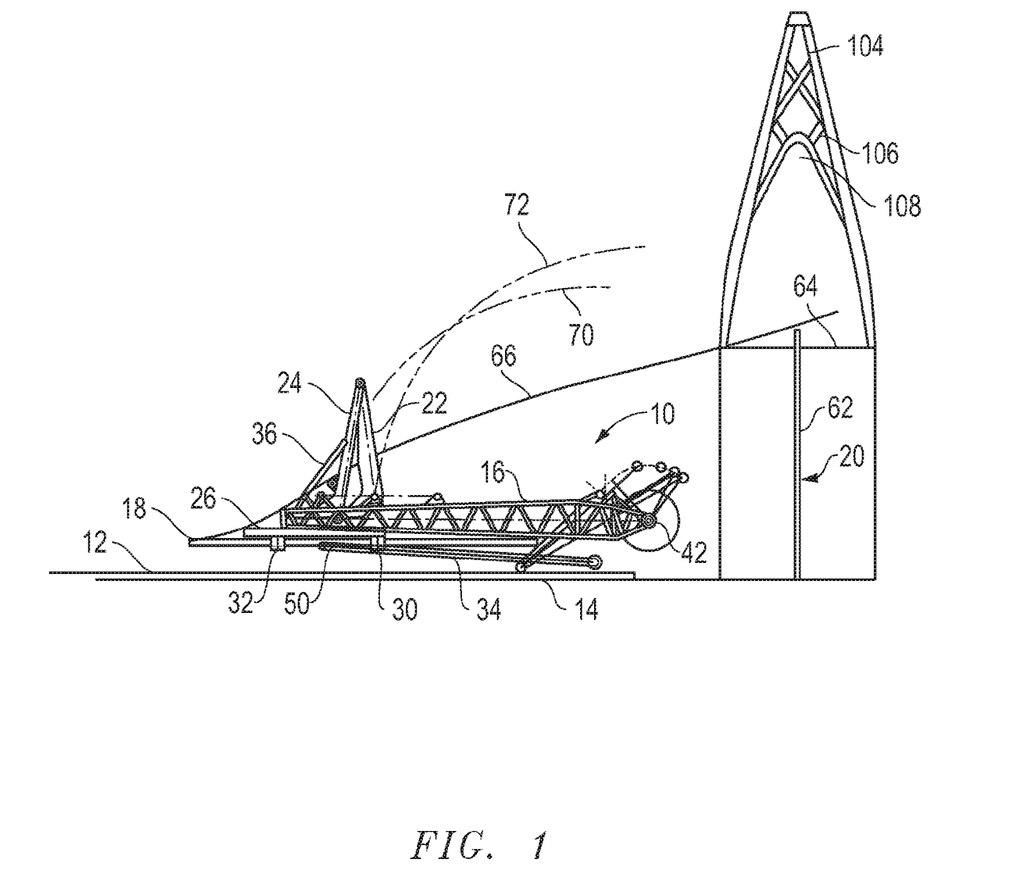
FIG. 1 shows a side elevational view of the pipe handling apparatus in the first position and the pipe in the horizontal orientation.

Referring to FIG. 1, there is shown a side elevational view of a pipe handling apparatus 10 in the first position, with a pipe 18 positioned in a generally horizontal orientation. The pipe 18 is delivered to the apparatus 10 in a position below the main rotating structural member 16. In particular, the pipe 18 can be loaded upon the skid 12 in a location generally adjacent to the grippers 30 and 32 associated with the stab frame 26. The apparatus 10 thus facilitates the easy delivery of the pipe 18 to the grippers 30 and 32. The grippers 30 and 32 grip the outer surface of the pipe 18 when the pipe 18 is in the horizontal orientation.

In FIG. 1, it can be seen that the main rotating structural member 16 resides above the pipe 18 and in generally parallel relationship to the top surface of the skid 12. The lever assembly 22 is suitably pivoted so that the arm 24 extends through the interior of the framework of the main rotating structural member 16 and such that the grippers 30 and 32 engage the pipe 18. The brace 36 resides in connection with the small framework of the main rotating structural member 16 and also is pivotally connected to the arm 24. The link 34 will reside below the main rotating structural member 16 generally adjacent to the upper surface of the skid 12 and is connected to the second portion 50 of the lever assembly 22 below the main rotating structural member 16.

Figure 2:
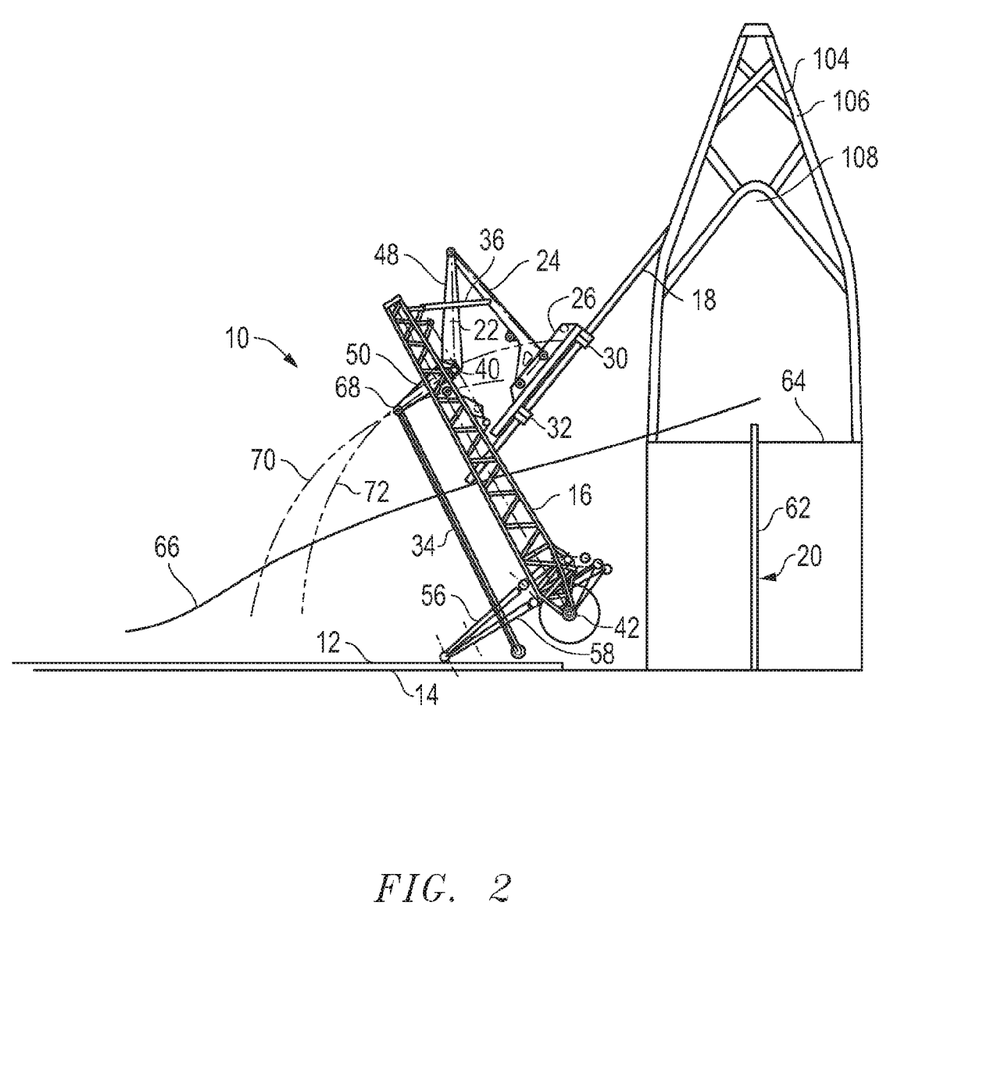
FIG. 2 shows a side elevational view of the pipe handling apparatus in an intermediate position.

Referring to FIG. 2, there is shown the pipe handling apparatus 10 in an intermediate position. The main rotating structural member 16 has rotated to an intermediate position between the first position seen in FIG. 1 and a second position seen in FIG. 3 below. The main rotating structural member 16 thus rotates the pipe 18 from the horizontal orientation to an intermediate orientation. Additionally, the main rotating structural member 16 has pivoted about point 42 from the first position to the intermediate position. The hydraulic actuators 56 and 58 urge the main rotating structural member 16 angularly upwardly away from the top surface of the skid 12. This causes the link 34 to have a pulling force on the pivotal connection 68 of the second portion 50 of the lever assembly 22. This causes the first portion 48 of the lever assembly 22 to move upwardly thereby causing the arm 24, in combination with the brace 36, to lift the stab frame 26 further upwardly and draw the pipe 18 completely through the interior of the main rotating structural member 16. As can be seen, the relative size and relation of the various components of the present invention achieve the movement of the pipe 18 without the need for separate hydraulic actuators.

The apparatus 10 is positioned next to an oil derrick 104. The derrick 104 is a structural framework 106 typical of oil derricks that have V-doors 108 on the sides thereof.

In FIG. 2, the pipe handling apparatus 10 is mounted on a skid 12 that is supported upon the bed 14 of a vehicle, such as a truck. The lever assembly 22 is pivotally connected to the main rotating structural member 16. An arm 24 is pivotally connected to an end of the lever assembly 22 opposite the main rotating structural member 16. A stab frame 26 is fixedly connected to an end of the arm 24 opposite the lever assembly 22. Grippers 30 and 32 are translatably attached to the stab frame 26. A link 34 has one end pivotally connected to the skid 12 and an opposite end pivotally connected to the end of the lever assembly 22 opposite the arm 24. A brace 36 is pivotally connected to the main rotating structural member 16 and also pivotally connected to the arm 24 between the lever assembly 22 and the stab frame 26.

The main rotating structural member 16 is a structural framework of struts, cross members and beams. In particular, the main rotating structural member 16 is configured so as to have an open interior such that the pipe 18 passes through the interior thereof as the apparatus 10 moves the pipe 18 between the horizontal and vertical orientations. The end 38 of the main rotating structural member 16 should be strongly reinforced so as to provide the necessary structural integrity to the main rotating structural member 16. A lug 40 extends outwardly from one side of the main rotating structural member 16. This lug 40 is suitable for pivotable connection to the lever assembly 22. The main rotating structural member 16 is pivotally connected at the opposite end 42 to a location on the skid 12. The pivotable connection at end 42 of the main rotating structural member 16 is located in offset relationship and above the pivotable connection 44 of the link 34 with the skid 12. A small frame member 46 extends outwardly from the side of the main rotating structural member 16 opposite the link 34. This frame assembly 46 has a pivotable connection with the brace 36.

The lever assembly 22 includes a first portion 48 and a second portion 50. The first portion 48 extends at an obtuse angle with respect to the second portion 50. The link 34 is pivotally connected to the end of the second portion 50 opposite the first portion 48. The arm 24 is pivotally connected to the end of the first portion 48 opposite the second portion 50. The lug 40 of the main rotating structural member 16 is pivotally connected in an area generally between the first portion 48 and the second portion 50. This unique arrangement of the lever assembly 22 facilitates the ability of the present invention to carry out the movement of the pipe 18 between the horizontal orientation and the vertical orientation. The arm 24 has an end pivotally connected to the end of the first portion 48 of the lever assembly 22.

The oil derrick 104 shown in FIG. 2 has V-door 108 and a V-door 110. V-door 110 faces the pipe handling apparatus 10. The arrow shown in FIG. 2 points to the top of the V-door 110. The pipe handling apparatus 10 moves the pipe 18 through V-door 110 according to the disclosed method. The stab frame 26 has grippers 30 and 32 translatable along the length of the stab frame 26. The translation of the grippers 30 and 32 allows the pipe 18 to be properly moved through the V-door 110 of the oil derrick 104. The grippers 30 and 32 are in the nature of conventional grippers which can open and close so as to engage the outer surface of the pipe 18. As used herein, grippers can be a gripper, a tong, a spinner, or any other pipe-grasping device.

The link 34 is an elongate member that extends from the pivotable connection 44 to the pivotable connection 68 of the second portion 50 of the lever assembly 22. The link 34 is non-extensible and extends generally adjacent to the opposite side from the main rotating structural member 16 from that of the arm 24. The link 34 will generally move relative to the movement of the main rotating structural member 16. The brace 36 is pivotally connected to the small framework 46 associated with main rotating structural member 16 and is also pivotally connected at a location along the arm 24 between the ends thereof. Brace 36 provides structural support to the arm 24 and also facilitates the desired movement of the arm 24 during the movement of the pipe 18 between the horizontal orientation and the vertical orientation.

Actuators 56 and 58 are illustrated as having one end connected to the skid 12 and an opposite end connected to the main rotating structural member 16 in a location above the end 42. When the actuators 56 and 58 are activated, they will pivot the main rotating structural member 16 upwardly from the horizontal orientation ultimately to a position beyond vertical so as to cause the pipe 18 to achieve a vertical orientation. Within the concept of the present invention, a single hydraulic actuator can be utilized instead of the pair of hydraulic actuators 56 and 58, as illustrated in FIG. 2.

The drill string 20 is illustrated as having pipe 62 extending upwardly so as to have an end above the drill floor 64. When the pipe 18 is in its vertical orientation, the translatable movement of the grippers 30 and 32 can be utilized so as to cause the end of the pipe 18 to engage with the box of the pipe 62.

In FIG. 2, the general movement of the pipe 18 is illustrated by line 66. Line 70 illustrates the movement of the pivot point 68 of the connection between the lever assembly 22 and the link 34. Line 72 illustrates the movement of the pivotable connection 40 between the main rotating structural member 16 and the lever assembly 22. The coordinated movement of each of the non-extensible members of the apparatus 10 is achieved with proper sizing and angular relationships. In essence, apparatus 10 provides a four-bar link between the various components. As a result, the movement of the pipe 18 between a horizontal orientation and a vertical orientation can be achieved purely through the mechanics associated with the various components. As can be seen, only a single hydraulic actuator may be necessary so as to achieve this desired movement. There does not need to be coordinated movement of hydraulic actuators. The hydraulic actuators are only used for the pivoting of the main rotating structural member 16. Because the skid 12 is located on the bed of a vehicle 14, the vehicle 14 can be maneuvered into place so as to properly align with the centerline of the pipe 62 of the drill string 20. Once the proper alignment is achieved by the vehicle 14, the apparatus 10 can be operated so as to effectively move the pipe to its desired position. The grippers 30 and 32 allow the pipe 18 to be moved upwardly and downwardly for the proper stabbing of the pipe 62. The apparatus 10 is adaptable to various lengths of pipe 18, especially pipe of ninety-foot length.

In FIG. 2, the grippers 32 and 30 are engaged with the pipe 18. The lever assembly 22 pivots so that pipe 18 passes through the interior of the framework of the main rotating structural member 16. Also, the arm 24 associated with stab frame 26 serves to move the stab frame 26 through the interior of the main rotating structural member 16. The brace 36 pulls on the first portion 48 of lever assembly 22 so as cause this motion to occur. The link 34 pulls on the end of the second portion 50 of the lever assembly 22 so as to draw the first portion 48 upwardly and to cause the movement of the stab frame 26. The hydraulic actuators 56 and 58 have been operated so as to urge the main rotating structural member 16 pivotally upwardly away from the first position.

Figure 3:
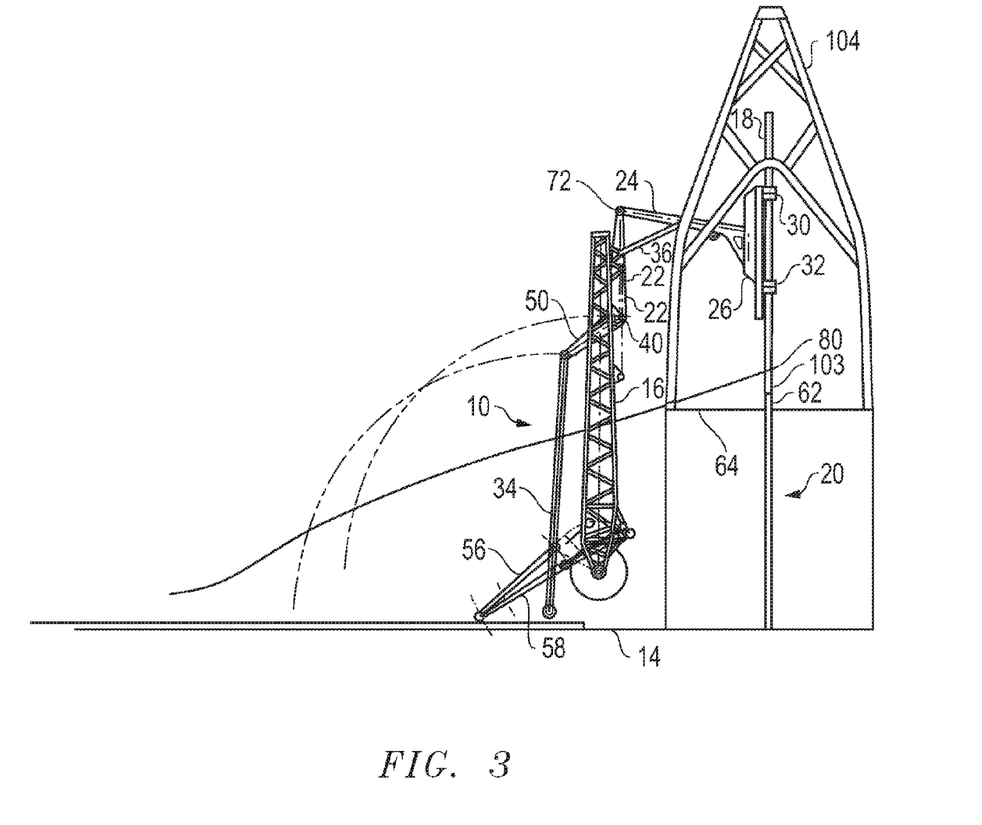
FIG. 3 shows a side elevational view of the pipe handling apparatus in the second position and the pipe in the vertical orientation.

Referring to FIG. 3, there is shown a side elevational view of the apparatus 10 in the second position, with the pipe 18 in the vertical orientation. As can be seen, the pipe 18 is positioned directly above the underlying pipe 62 on the drill string 20. The main rotating structural member 16 has articulated from the intermediate position to the second position. The main rotating structural member 16 is articulated to the second position after the grippers 30 and 32 translate along stab frame 26. The further upward pivotal movement of the main rotating structural member 16 to the second position is caused by the hydraulic cylinders 56 and 58. This causes the link 34 to rotate and draw the end of the second portion 50 of the lever assembly 22 downwardly. The lever assembly 22 rotates about the pivot point 40 such that the first portion 48 of the lever assembly 22 has a pivot 72 at its upper end. The brace 36 is now rotated in a position so as to provide support for the arm 24 in this upper position. If any further precise movement is required between the bottom end 80 of the pipe 18 and the upper end 82 of pipe 62, then the vehicle 14 can be moved slightly so as to achieve further precise movement. In the manner described hereinbefore, the drill pipe 18 has achieved a completely vertical orientation by virtue of the interrelationship of the various components of the present invention and without the need for complex control mechanisms and hydraulics. When the apparatus 10 is in the second position, the grippers 30 and 32 translate along the side of the stab frame 26.

Figure 4:
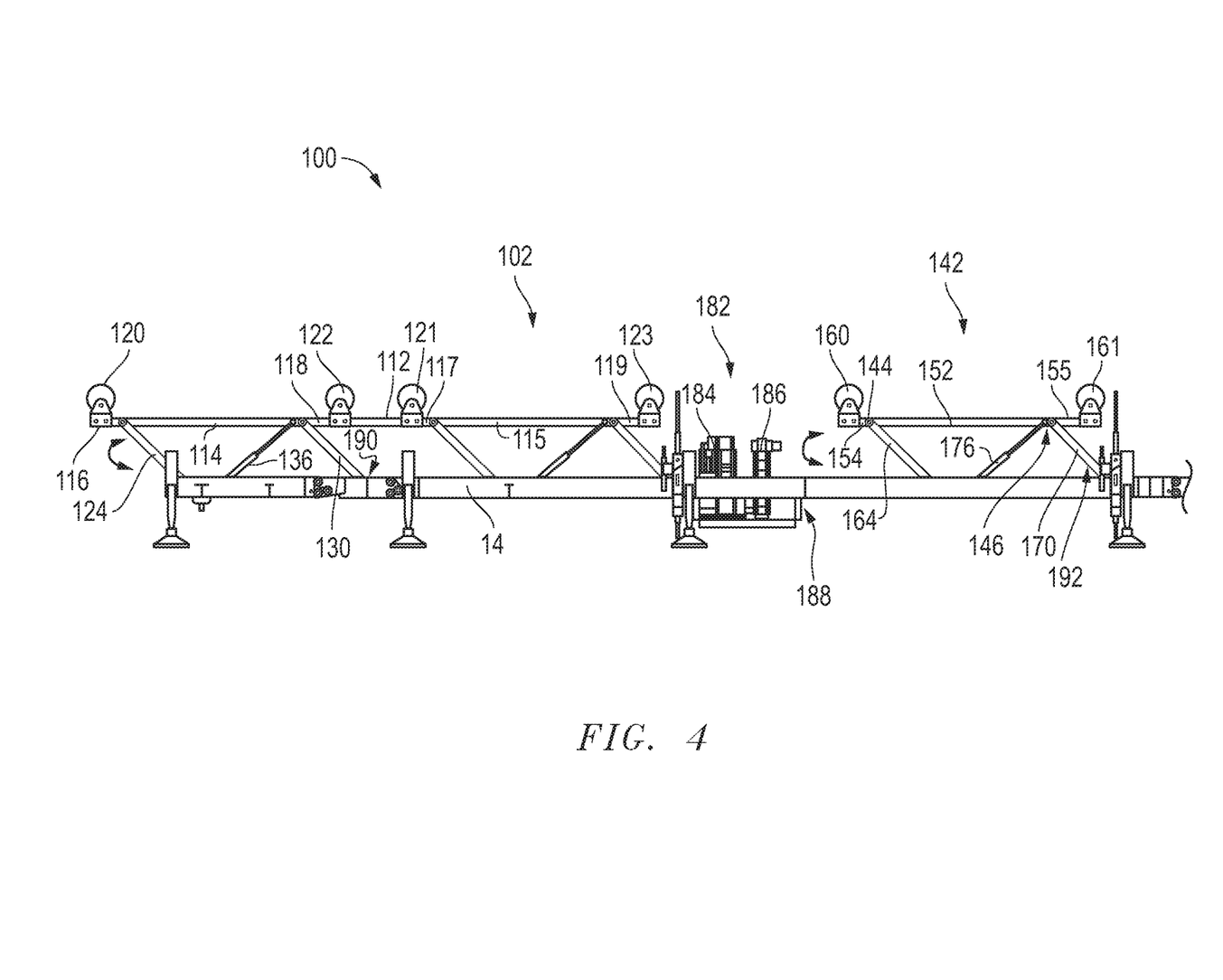
FIG. 4 shows a side elevational view of the pipe stand.

Referring to FIG. 4, there is shown a side elevational view of the preferred pipe stand 100 for feeding and receiving pipe in a horizontal orientation to and from a pipe handling apparatus. The pipe stand 100 has a first pipe-lifting mechanism 102, a second pipe-lifting mechanism 142, and a pipe-rotating mechanism 182 positioned between the first and second pipe-lifting mechanisms 102 and 142. The bottom 190 of the first pipe-lifting mechanism 102 is pivotally connected to the skid 14 of the pipe handling apparatus. The bottom 192 of the second pipe-lifting mechanism 142 is pivotally connected to the skid 14 of the pipe handling apparatus. The bottom 188 of the pipe-rotating mechanism 182 is connected to the skid 14 of the pipe handling apparatus.

The first lifting mechanism 102 comprises a central beam 112, a first roller member 114 connected to an end 118 of the central beam 112, and a second roller member 115 connected to an opposite end 117 of the central beam 112. The first roller member 114 has a first pivot rod 124 pivotally connected adjacent an end 116 of the first roller member 114, a second pivot rod 130 pivotally connected adjacent the end 118 of the central beam 112, and a piston-and-cylinder assembly 136 pivotally connected adjacent the end 118 of the central beam 112. The first roller member 114 has a first spinner 120 adjacent the end 116 thereof and a second spinner 122 attached adjacent the end 118 of the central beam 112. In this exemplary embodiment, the first roller member 114 and the second roller member 115 are symmetrical. The second roller member 115 has a first spinner 121 attached adjacent the opposite end 117 of the central beam 112 and a second spinner 123 adjacent an opposite end 119 thereof. The first and second roller members 114 and 115 can be slidable relative to the central beam 112.

The second lifting mechanism 142 comprises a central beam 152, a first roller member 154 connected to an end 144 of the central beam 152, a second roller member 155 connected to an opposite end 146 of the central beam 152, a first pivot rod 164 pivotally connected adjacent the end 144 of the central beam 152, a second pivot rod 170 pivotally connected adjacent the opposite end 146 of the central beam 152, and a piston-and-cylinder assembly 176 pivotally connected adjacent the opposite end 146 of the central beam 152. The first roller member 154 has a spinner 160 attached thereto. The second roller member 155 has a spinner 161 attached thereto. The first and second roller members 154 and 155 can be slidable relative to the central beam 152.

The pipe-rotating mechanism 182 comprises a gripper 184 and a spinner member 186 positioned adjacent the gripper 184. The gripper 184 grips a first pipe section while the spinner member 186 rotates a second pipe section so as to make or break a connection between the first and second pipe sections.

The first and second pipe-lifting mechanisms 102 and 142 are shown in FIG. 4 in an upward position where pipe is transferred to and from a pipe rack and to and from a pipe handling apparatus. The first and second pipe-lifting mechanisms 102 and 142 also have a lower position where the connection between the first and second pipe sections is made and broken. The double-ended arrows shown in FIG. 4 show the movement path of the first and second pipe-lifting mechanisms 102 and 142. When in the lower position, the spinners 120, 122, 121, 123, 160, and 161 are aligned with the gripper 184 and spinner member 186 so that pipe sections can be moved laterally along the pipe stand 100 so as to align pipe connections with the pipe-rotating mechanism 182. Thus, the pipe-rotating mechanism 182 also includes means for laterally moving the pipe while the pipe section is resting in the pipe stand 100.

Each of the pivot rods 124, 130, 164, and 170 have a first portion extending angularly from a second portion. Both ends of each of the pivot rods 124, 130, 164, and 170 are pivotally connected to parts of the pipe stand 100 so that the pipe stand 100 can be stabilized while the pistons of the piston-and-cylinder assemblies 136 and 176 extend and retract from the cylinders of the same. The first and second roller members 114 and 115 are laterally slidable relative to the central member 112 so as to increase and decrease the length of the roller members 114 and 115 for a given length of pipe. The first and second roller members 154 and 155 are laterally slidable relative to the central member 152 so as to increase and decrease the length of the roller members 154 and 155 for a given length of pipe. The pipe-rotating mechanism 182 of the pipe stand 100 remains stationary while the first and second pipe-lifting mechanisms 102 and 142 move between the upward and lower positions.

Figure 5:
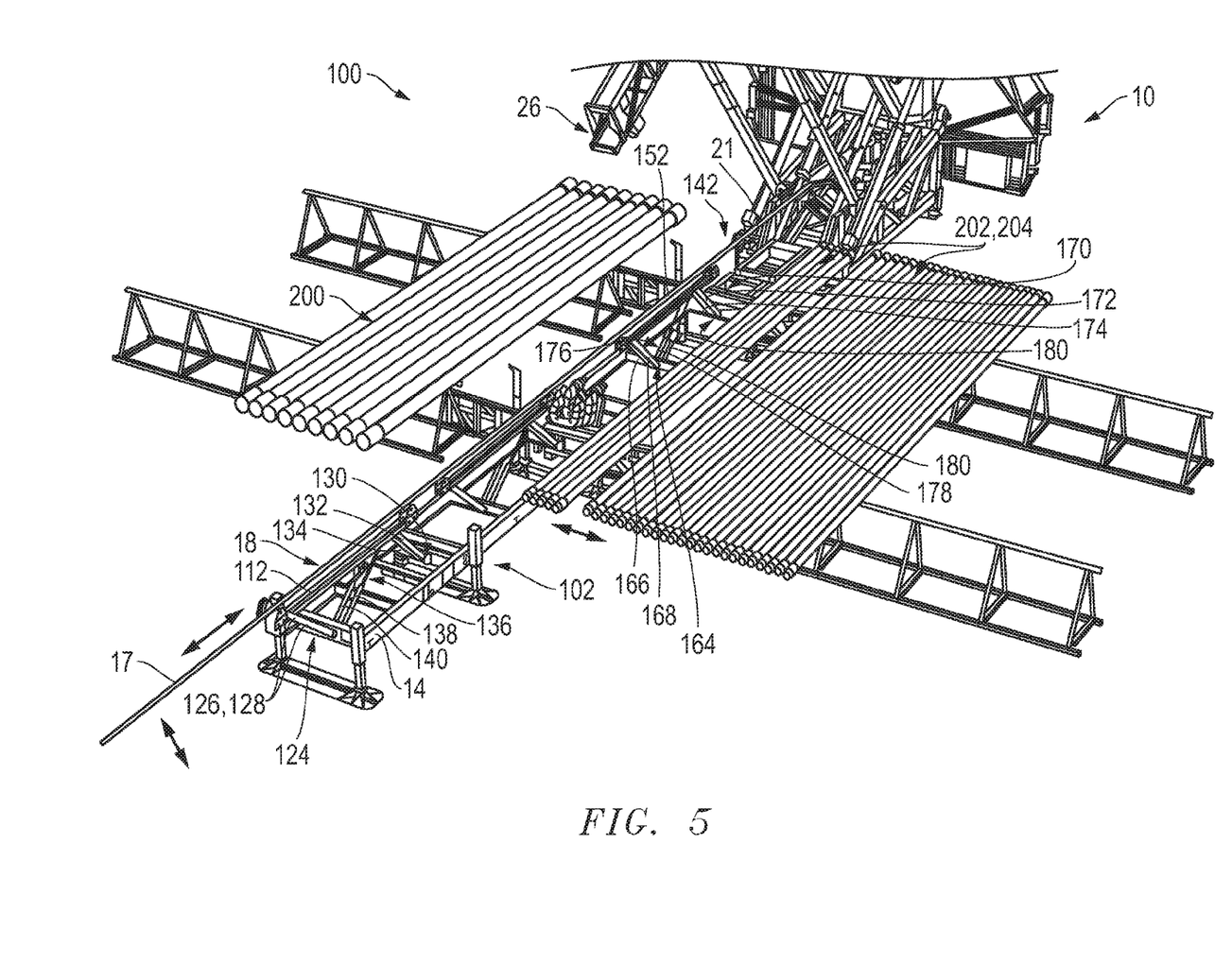
FIG. 5 shows a perspective view of the pipe stand used with a pipe handling apparatus, with the pipe stand in the upward position.

Referring to FIG. 5, there is shown a perspective view of the pipe stand 100 used with the pipe handling apparatus 10 described in FIGS. 1-3 above, with the pipe stand 100 in the upward position. The pipe stand 100 is positioned under the boom (main rotating structural member) 16 of the pipe handling apparatus 10 when the apparatus 10 is in the first position. The pipe stand extends within the skid 14. Casing racks 200 are placed adjacent the pipe stand 100. Pipe racks 202 and 204 are placed adjacent the pipe stand 100 as well. The pipe 18 has a first pipe section 17 and a second pipe section 21. Each of the first and second pipe sections 17 and 21 can be a length of approximately thirty feet to approximately ninety feet. The connection between the pipe sections 17 and 21 is made-up in FIG. 5 because the pipe stand 100 is in the lower position.

The first pivot rod 124 of the first pipe-lifting mechanism 102 has a pair of pivot rods 126 and 128. One of the pivot rods 126 of the first pivot rod 124 is connected to a side of the central beam 112 and another of the pivot rods 128 of the first pivot rod 124 is connected to an opposite side of the central beam 112. The second pivot rod 130 of the first pipe-lifting mechanism 102 has a pair of pivot rods 132 and 134. One of the pivot rods 132 of the second pivot rod 130 is connected to a side of the central beam 112 and another of the pivot rods 134 of the second pivot rod 130 is connected to an opposite side of the central beam 112. The piston-and-cylinder assembly 136 comprises a pair of piston-and-cylinder assemblies 138 and 140. One of the piston-and-cylinder assemblies 138 of the pair is connected to a side of the central beam 112 and another of the piston-and-cylinder assemblies 140 of the pair is connected to an opposite side of the central beam 112.

The first pivot rod 164 of the second pipe-lifting mechanism 142 has a pair of pivot rods 166 and 168. One of the pivot rods 166 of the first pivot rod 164 is connected to a side of the central beam 152 and another of the pivot rods 168 of the first pivot rod 164 is connected to an opposite side of the central beam 152. The second pivot rod 170 of the second pipe-lifting mechanism 142 has a pair of pivot rods 172 and 174. One of the pivot rods 172 of the second pivot rod 170 is connected to a side of the central beam 152 and another of the pivot rods 174 of the second pivot rod 170 is connected to an opposite side of the central beam 152. The piston-and-cylinder assembly 176 comprises a pair of piston-and-cylinder assemblies 178 and 180. One of the piston-and-cylinder assemblies 178 of the pair is connected to a side of the central beam 152 and another of the piston-and-cylinder assemblies 180 of the pair is connected to an opposite side of the central beam 152.

When the pipe stand 100 is in the upward position as is shown in FIG. 5, the pipe 18 is positioned above the pipe-rotating mechanism 182.

Figure 6:
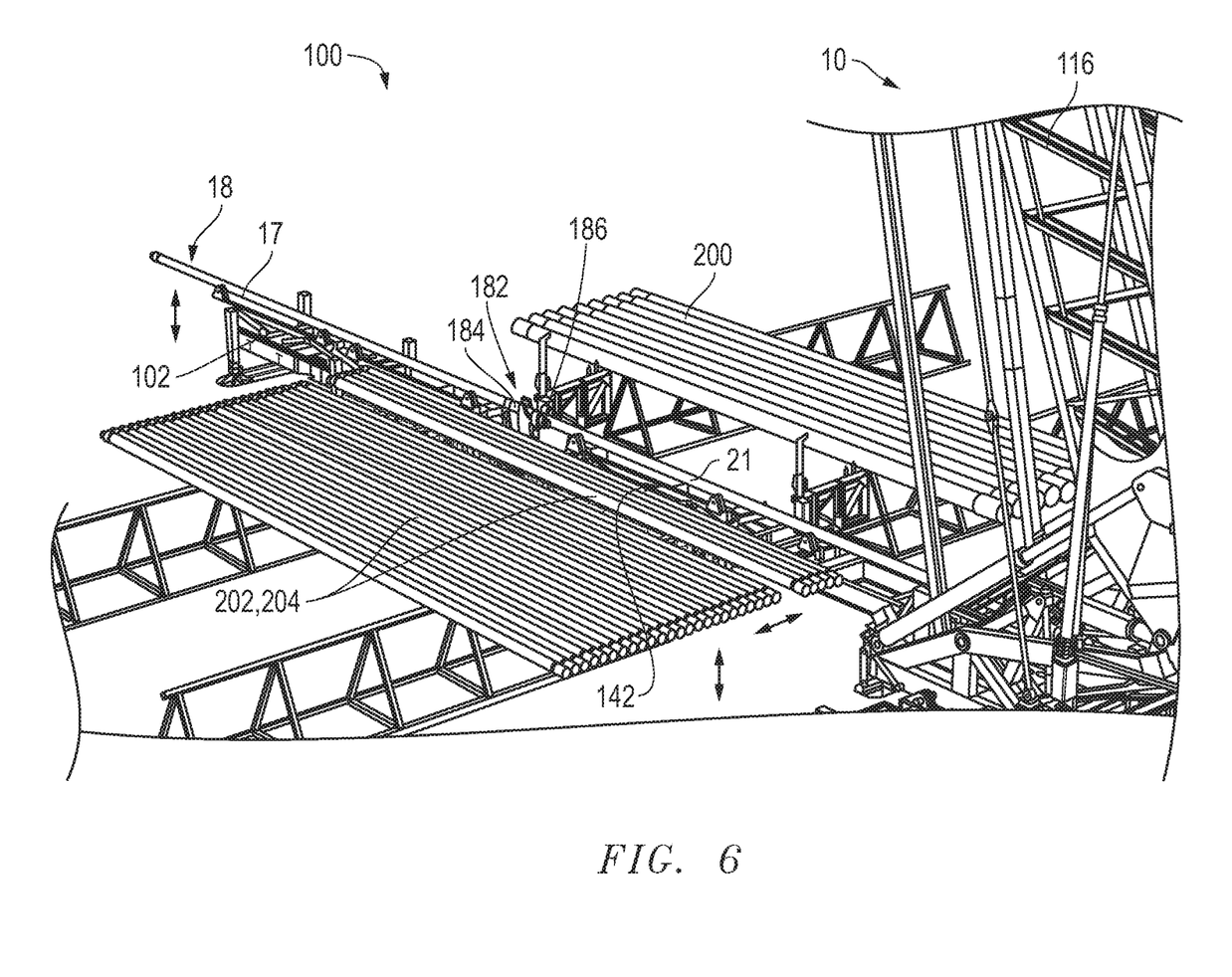
FIG. 6 shows another perspective view of the pipe stand used with a pipe handling apparatus, with the pipe stand in the lower position.

Referring to FIG. 6, there is shown another perspective view of the pipe stand 100 used with a pipe handling apparatus 10, with the pipe stand 100 in the lower position. In the lower position, the pipe 18 is within the pipe-rotating mechanism 182. The gripper 184 of the pipe-rotating mechanism 182 grips the first pipe section 17 while the spinner member 186 rotates the second pipe section 21 so as to make or break the connection between the first and second pipe sections 17 and 21 of the pipe 18. The first pipe-lifting mechanism 102 and second pipe lifting-mechanism 142 are in the lower position and support the length of the pipe 18 while the pipe-rotating mechanism 182 makes or breaks the pipe connection. Particularly, the first pipe-lifting mechanism 102 supports the first pipe section 17 and the second pipe-lifting mechanism 142 supports the second pipe section 21. If two joints are to be made up, having a third pipe section, the jointed section is shifted away from the rig and the third section is brought up.

When the pipe connection between the first and second pipe sections 17 and 21 is made or broken as desired by the pipe-rotating mechanism 182, the pipe 18 is moved laterally on the spinners of the first and second pipe-lifting mechanisms 102 and 142. If the pipe connection is made, the pipe 18 is laterally moved so that the pipe stand 100 can receive another section from the casing rack 200 or pipe racks 202 and 204 to add to the pipe 18. If the pipe connection is broken, the pipe 18 is laterally moved so that one of the first or second pipe sections 17 and 21 can be moved to the casing rack 200 or the pipe racks 202 and 204 for storage. The pipe-rotating mechanism 182 has the ability to move the pipe 18 laterally. The first and second pipe-lifting mechanisms 102 and 142 can also includes moves for laterally moving the pipe 18.

Figure 7:
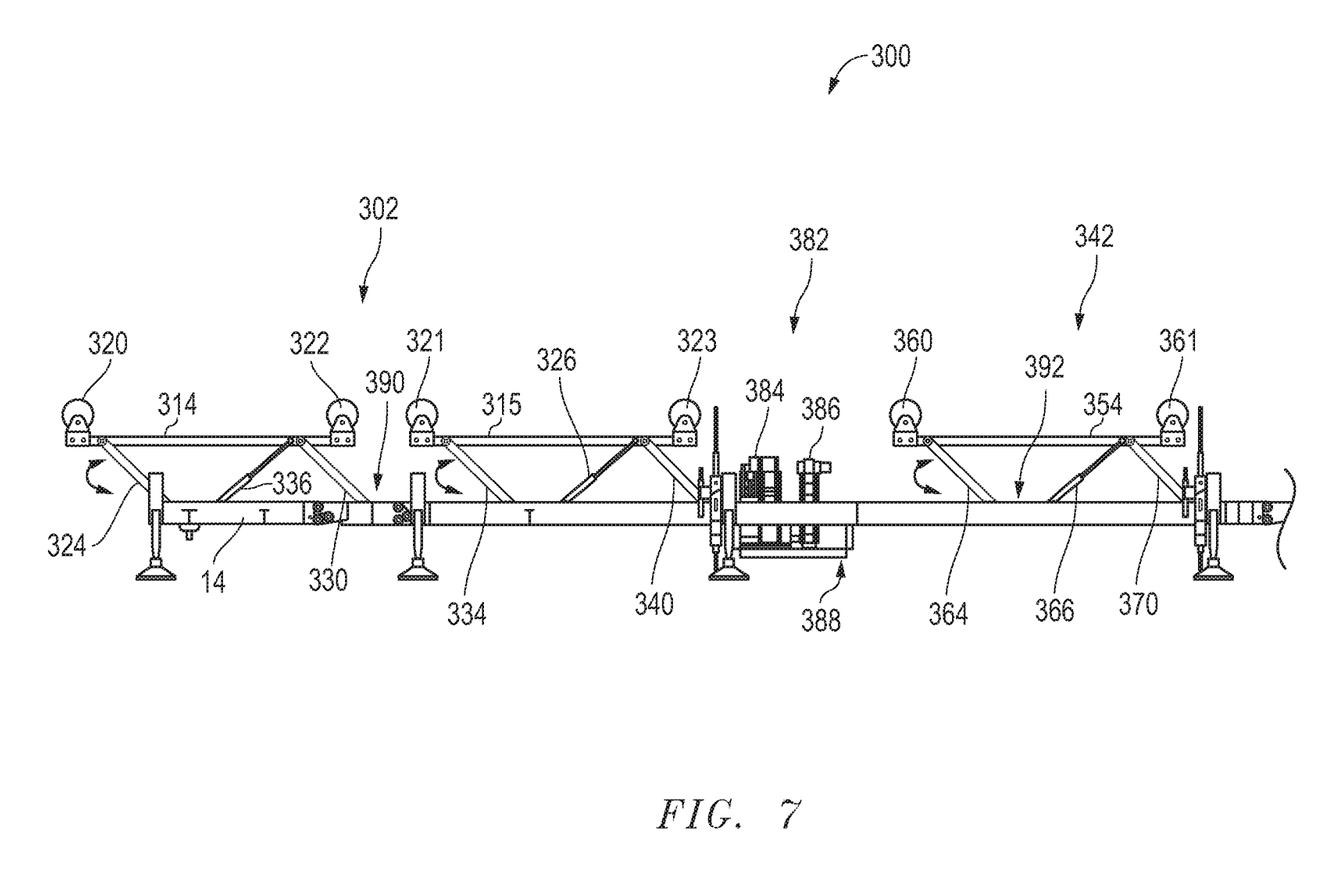
FIG. 7 shows a side elevational view of an exemplary embodiment of the pipe stand.

Referring to FIG. 7, there is shown a side elevational view of another preferred pipe stand 300 for feeding and receiving pipe in a horizontal orientation to and from a pipe handling apparatus. The pipe stand 300 has a first pipe-lifting mechanism 302, a second pipe-lifting mechanism 342, and a pipe-rotating mechanism 382 positioned between the first and second pipe-lifting mechanisms 302 and 342. The bottom 390 of the first pipe-lifting mechanism 302 is pivotally connected to the skid 14 of the pipe handling apparatus. The bottom 392 of the second pipe-lifting mechanism 342 is pivotally connected to the skid 14 of the pipe handling apparatus. The bottom 388 of the pipe-rotating mechanism 382 is connected to the skid 14 of the pipe handling apparatus.

The first lifting mechanism 302 comprises a first roller member 314 and a second roller member 315, each of the roller members having first pivot rods 324, 334, second pivot rods 330, 340 and piston-and-cylinder assemblies 336, 326. Each of the pivot rods 324, 330, 334, 340 connects an end and an opposite end of each of the first and second roller members 314, 315 to the skid 14. The piston-and-cylinder assemblies 336, 326 connect from the pivotal connection between the roller members 314, 315 and the second pivot rods 330, 340 to the pivotal connection between the skid 14 and the first pivot rods 324, 334.

The first roller member 314 has a first spinner 320 adjacent an end thereof and a second spinner 322 attached adjacent an opposite end thereof. The second roller member 315 has a first spinner 321 attached adjacent an end thereof and a second spinner 323 adjacent an opposite end thereof.

The second lifting mechanism 342 comprises first roller member 354, the first roller member including a first pivot rod 364, a second pivot rod 370 and a piston-and-cylinder assembly 366. Each of the pivot rods 364, 370 connects an end and an opposite end of the first roller member 354 to the skid 14. The piston-and-cylinder assembly 366 connects from the pivotal connection between the first roller member 354 and the second pivot rod 370 to the pivotal connection between the skid 14 and the first pivot rod 364.

The pipe-rotating mechanism 382 comprises a gripper 384 and a spinner member 386 positioned adjacent the gripper 384. The gripper 384 grips a first pipe section while the spinner member 386 rotates a second pipe section so as to make or break a connection between the first and second pipe sections.

The first and second pipe-lifting mechanisms 302 and 342 are shown in FIG. 7 in an upward position where pipe is transferred to and from a pipe rack and to and from a pipe handling apparatus. The first and second pipe-lifting mechanisms 302 and 342 also have a lower position where the connection between the first and second pipe sections is made and broken. The double-ended arrows shown in FIG. 7 show the movement path of the first and second pipe-lifting mechanisms 302 and 342. When in the lower position, the spinners 320, 322, 321, 323, 360, and 361 are aligned with the gripper 384 and spinner member 386 so that pipe sections can be moved laterally along the pipe stand 300 so as to align pipe connections with the pipe-rotating mechanism 382. Thus, the pipe-rotating mechanism 382 also includes means for laterally moving the pipe while the pipe section is resting in the pipe stand 300.

Each of the pivot rods 324, 330, 334, 340, 364, and 370 has a first portion extending angularly from a second portion. Both ends of each of the pivot rods 324, 330, 334, 340, 364, and 370 are pivotally connected to parts of the pipe stand 300 so that the pipe stand 300 can be stabilized while the pistons of the piston-and-cylinder assemblies 336, 326 and 366 extend and retract from the cylinders of the same. The first and second roller members 314 and 315 of the first pipe lifting mechanism 302 are laterally slidable so as to increase and decrease the length of the roller members 314 and 315 for a given length of pipe. The first roller member 354 of the second lifting mechanism is laterally slidable so as to accommodate a given length of pipe. The pipe-rotating mechanism 382 of the pipe stand 300 remains stationary while the first and second pipe-lifting mechanisms 302 and 342 move between the upward and lower positions.

The foregoing disclosure and description of the invention is illustrative and explanatory thereof. Various changes in the details of the illustrated construction can be made without departing from the true spirit of the invention. The present invention should be limited only by the disclosed specification.

The invention claimed is:

1. A pipe stand for use with a pipe handling apparatus, comprising:
   a first pipe-lifting mechanism supported on a skid of the pipe handling apparatus;
   a second pipe-lifting mechanism supported on the skid of the pipe handling apparatus; and
   a pipe-rotating mechanism positioned between the first and second pipe-lifting mechanisms, the pipe-rotating mechanism is connected to the skid of the pipe handling apparatus; and
   wherein the pipe stand is positioned under a boom of the pipe handling apparatus when the apparatus is in the first position, and the pipe stand extends within the skid of the pipe handling apparatus.

2. The pipe stand of claim 1, wherein the first lifting mechanism further comprising:
   a central beam,
   a first roller member connected to an end of the central beam, the first roller member has a first spinner attached to an end thereof and a second spinner attached to an opposite end thereof;
   a second roller member connected to an opposite end of the central beam, the second roller member has a first spinner attached to an end thereof and a second spinner attached to an opposite end thereof;
   a pair of first pivot rods pivotally connected adjacent the end of the central beam, one of the first pivot rods is connected to a side of the central beam and the other of the first pivot rods is connected to an opposite side of the central beam;
   a pair of second pivot rods pivotally connected adjacent the opposite end of the central beam, one of the second pivot rods is connected to the side of the central beam and the other of the second pivot rods is connected to the opposite side of the central beam;
   a pair of cylinder assemblies pivotally connected adjacent the opposite end of the central beam, one of the cylinder assemblies is connected to the side of the central beam and the other of the cylinder assemblies is connected to the opposite side of the central beam; and
   wherein the first and second roller members are slidable relative to the central beam.

3. The pipe stand of claim 1, wherein the second lifting mechanism further comprising:
   a central beam,
   a first roller member connected to an end of the central beam, the first roller member has a first spinner attached to an end thereof;
   a second roller member connected to an opposite end of the central beam, the second roller member has a first spinner attached to an end thereof;
   a pair of first pivot rods pivotally connected adjacent the end of the central beam, one of the first pivot rods is connected to the side of the central beam and the other of the first pivot rods is connected to the opposite side of the central beam;
   a pair of second pivot rods pivotally connected adjacent the opposite end of the central beam, one of the second pivot rods is connected to a side of the central beam and the other of the second pivot rods is connected to an opposite side of the central beam; and
   a pair of cylinder assemblies pivotally connected adjacent the opposite end of the central beam, one of the cylinder assemblies is connected to the side of the central beam and the other of the cylinder assemblies is connected to the opposite side of the central beam; and
   wherein the first and second roller members are slidable relative to the central beam.

4. The pipe stand of claim 1, wherein the pipe-rotating mechanism further comprises:
   a gripper;
   a spinner member positioned adjacent the gripper; and
   wherein the gripper grips a first pipe section while the spinner member rotates a second pipe section so as to make or break a connections between the first and second pipe sections.

5. The pipe stand of claim 4, wherein each of the first and second pipe-lifting mechanisms is movable between an upward position where pipe is transferred to and from a pipe rack and to and from a pipe handling apparatus and a lower position where the connected between the first and second pipe sections is made and broken.

6. The pipe stand of claim 4, wherein each of the first and second pipe sections can be a length of approximately thirty feet to approximately ninety feet.

7. A pipe stand for use with a pipe handling apparatus, comprising:

a first pipe-lifting mechanism supported on a skid of the pipe handling apparatus;

a second pipe-lifting mechanism supported on the skid of the pipe handling apparatus; and a pipe-rotating mechanism positioned between the first and second pipe-lifting mechanisms, the pipe-rotating mechanism is supported on the skid of the pipe handling apparatus; and wherein the pipe stand is positioned under a boom of the pipe handling apparatus when the apparatus is in a first position, and the pipe stand extends within the skid of the pipe handling apparatus.

8. The pipe stand of claim 7, wherein the first lifting mechanism further comprising:

a first roller having a first spinner adjacent to an end thereof and a second spinner adjacent to an opposite end thereof;

a second roller having a first spinner adjacent to an end thereof and a second spinner adjacent to an opposite end thereof;

each of the first and second rollers comprising:

a pair of first pivot rods pivotally connected adjacent the end of each of the first and second rollers, one of the first pivot rods is connected to a side of each of the first and second rollers and the other of the first pivot rods is connected to an opposite side of each of the first and second rollers;

a pair of second pivot rods pivotally connected adjacent the opposite end of each of the first and second rollers, one of the second pivot rods is connected to the side of each of the first and second rollers and the other of the second pivot rods is connected to each of the opposite side of the first and second rollers; and a pair of first cylinder assemblies pivotally connected to the pairs of the first and second pivot rods of each of the first and second roller members, the pair of the cylinder assemblies being configured to support movement of each of the first and second rollers; and wherein the first and second roller members are horizontally and vertically moveable.

9. The pipe stand of claim 7, wherein the second lifting mechanism further comprising:

a first roller having a first spinner adjacent to an end thereof and a second spinner adjacent to an opposite end thereof, the first roller comprising:

a pair of first pivot rods pivotally connected adjacent the end of the first roller, one of the first pivot rods is connected to a side of the first roller and the other of the first pivot rods is connected to an opposite side of the first roller;

a pair of second pivot rods pivotally connected adjacent the opposite end of the first roller, one of the second pivot rods is connected to the side of the first roller and the other of the second pivot rods is connected to the opposite side of the first roller; and a pair of first cylinder assemblies pivotally connected to the pairs of the first and second pivot rods of the first roller, the pair of the cylinder assemblies being configured to support movement of each of the first roller; and wherein the first roller is horizontally and vertically moveable.

10. The pipe stand of claim 7, wherein the pipe-rotating mechanism further comprises:

a gripper; and a spinner member positioned adjacent the gripper; and wherein the gripper grips a first pipe section while the spinner member rotates a second pipe section so as to make or break a connection between the first and second pipe sections.

11. The pipe stand of claim 10, wherein each of the first and second pipe-lifting mechanisms is movable between an upward position where pipe is transferred to and from a pipe rack and to and from a pipe handling apparatus and a lower position where the connection between the first and second pipe sections is made and broken.

12. The pipe stand of claim 10, wherein each of the first and second pipe sections can be a length of approximately thirty feet to approximately ninety feet.

13. An apparatus for use with a pipe handling apparatus, comprising:

a first pipe-lifting mechanism supported on a skid of the pipe handling apparatus; and a pipe-rotating mechanism positioned adjacent to the first mechanism, the pipe-rotating mechanism is connected to the skid of the pipe handling apparatus; and wherein the apparatus is positioned under a boom of the pipe handling apparatus when the pipe handling apparatus is in a first position, and the apparatus extends within the skid of the pipe handling apparatus.

14. The apparatus of claim 13, wherein the first lifting mechanism further comprising:

a first roller having a first spinner adjacent to an end thereof and a second spinner adjacent to an opposite end thereof, the first roller includes:

a pair of first pivot rods pivotally connected adjacent the end of the first roller, one of the first pivot rods is connected to a side of the first roller and the other of the first pivot rods is connected to an opposite side of the first roller;

a pair of second pivot rods pivotally connected adjacent the opposite end of the first roller, one of the second pivot rods is connected to the side of the first roller and the other of the second pivot rods is connected to the opposite side of the first roller; and a pair of first cylinder assemblies pivotally connected to the pairs of the first and second pivot rods of the first roller, the pair of the cylinder assemblies being configured to support movement of each of the first roller; and wherein the first roller is horizontally and vertically moveable.

15. The apparatus of claim 14, wherein the first lifting mechanism further comprising:

a second roller having a first spinner adjacent to an end thereof and a second spinner adjacent to an opposite end thereof, the second roller includes:

a pair of first pivot rods pivotally connected adjacent the end of the second roller, one of the first pivot rods is connected to a side of the second roller and the other of the first pivot rods is connected to an opposite side of the second roller;

a pair of second pivot rods pivotally connected adjacent the opposite end of the second roller, one of the second pivot rods is connected to the side of the second roller and the other of the second pivot rods is connected to the opposite side of the second roller; and a pair of first cylinder assemblies pivotally connected to the pairs of the first and second pivot rods of the second roller, the pair of the cylinder assemblies being configured to support movement of each of the second roller; and wherein the second roller is horizontally and vertically moveable.

16. The apparatus of claim 13, wherein the apparatus further comprising:
a second lifting mechanism supported on the skid of the pipe handling apparatus, the second lifting mechanism comprising:
a first roller having a first spinner adjacent to an end thereof and a second spinner adjacent to an opposite end thereof, the first roller includes:
a pair of first pivot rods pivotally connected adjacent the end of the first roller, one of the first pivot rods is connected to a side of the first roller and the other of the first pivot rods is connected to an opposite side of the first roller;
a pair of second pivot rods pivotally connected adjacent the opposite end of the first roller, one of the second pivot rods is connected to the side of the first roller and the other of the second pivot rods is connected to the opposite side of the first roller; and
a pair of first cylinder assemblies pivotally connected to the pairs of the first and second pivot rods of the first roller, the pair of the cylinder assemblies being configured to support movement of each of the first roller; and
wherein the first roller is horizontally and vertically moveable.

17. The apparatus of claim 16, wherein the second lifting mechanism further comprising:
a second roller having a first spinner adjacent to an end thereof and a second spinner adjacent to an opposite end thereof, the second roller includes:
a pair of first pivot rods pivotally connected adjacent the end of the second roller, one of the first pivot rods is connected to a side of the second roller and the other of the first pivot rods is connected to an opposite side of the second roller;
a pair of second pivot rods pivotally connected adjacent the opposite end of the second roller, one of the second pivot rods is connected to the side of the second roller and the other of the second pivot rods is connected to the opposite side of the second roller; and
a pair of first cylinder assemblies pivotally connected to the pairs of the first and second pivot rods of the second roller, the pair of the cylinder assemblies being configured to support movement of each of the second roller; and
wherein the second roller is horizontally and vertically moveable.

18. The pipe stand of claim 13, wherein the pipe-rotating mechanism further comprises:
a gripper; and
a spinner member positioned adjacent the gripper; and
wherein the gripper grips a first pipe section while the spinner member rotates a second pipe section so as to make or break a connection between the first and second pipe sections.

19. The apparatus of claim 18, wherein each of the first and second pipe-lifting mechanisms is movable between an upward position where pipe is transferred to and from a pipe rack and to and from a pipe handling apparatus and a lower position where the connection between the first and second pipe sections is made and broken.

20. The apparatus of claim 18, wherein each of the first and second pipe sections can be a length of approximately thirty feet to approximately ninety feet.

* * * * *

UNITED STATES PATENT AND TRADEMARK OFFICE
CERTIFICATE OF CORRECTION

| | | |
|---|---|---|
| PATENT NO. | : 8,469,085 B2 | Page 1 of 1 |
| APPLICATION NO. | : 12/850572 | |
| DATED | : June 25, 2013 | |
| INVENTOR(S) | : Keith J. Orgeron | |

It is certified that error appears in the above-identified patent and that said Letters Patent is hereby corrected as shown below:

In the Drawings,
Sheet 1, Fig. 4, the reference numeral 14 should read 12
Sheet 2, Fig. 5, the reference numeral 14 should read 12
Sheet 3, Fig. 7, the reference numeral 14 should read 12

In the Specification,

Column 12,
Lines 7, 9 and 10, delete "14" and insert --12--

Column 13,
Line 22, delete "14" and insert --12--

Column 14,
Lines 38, 40, 42, 49, 52, 63 and 67, delete "14" and insert --12--

Signed and Sealed this
Fifteenth Day of October, 2013

Teresa Stanek Rea
*Deputy Director of the United States Patent and Trademark Office*